Sept. 25, 1956 G. C. ELLERBECK 2,764,347

MULTIPLYING-DIVIDING MACHINE, INCLUDING MECHANISM FOR REGISTERING A QUOTIENT IN A MULTIPLIER STORAGE DEVICE

Filed Nov. 7, 1952 7 Sheets-Sheet 1

GRANT C. ELLERBECK
INVENTOR.

BY Rolyn Wilcox
ATTORNEY

GRANT C. ELLERBECK
INVENTOR
BY Robyn Wilcox
ATTORNEY

Sept. 25, 1956 G. C. ELLERBECK 2,764,347

MULTIPLYING-DIVIDING MACHINE, INCLUDING MECHANISM FOR REGISTERING A QUOTIENT IN A MULTIPLIER STORAGE DEVICE

Filed Nov. 7, 1952 7 Sheets-Sheet 3

INVENTOR.
GRANT C. ELLERBECK
BY Robyn Wilcox
ATTORNEY

MULTIPLYING-DIVIDING MACHINE, INCLUDING MECHANISM FOR REGISTERING A QUOTIENT IN A MULTIPLIER STORAGE DEVICE

Filed Nov. 7, 1952

INVENTOR.
GRANT C. ELLERBECK
BY Rolyn Wilcox
ATTORNEY

INVENTOR.
GRANT C. ELLERBECK
BY Carolyn Kilroy
ATTORNEY

INVENTOR.
GRANT C. ELLERBECK
BY Robyn Wilcox
ATTORNEY

Sept. 25, 1956 G. C. ELLERBECK 2,764,347

MULTIPLYING-DIVIDING MACHINE, INCLUDING MECHANISM FOR REGISTERING A QUOTIENT IN A MULTIPLIER STORAGE DEVICE

Filed Nov. 7, 1952 7 Sheets-Sheet 7

INVENTOR.
GRANT C. ELLERBECK
BY Rolyn Hilcox
ATTORNEY 2,764,347

MULTIPLYING-DIVIDING MACHINE, INCLUDING MECHANISM FOR REGISTERING A QUOTIENT IN A MULTIPLIER STORAGE DEVICE

Grant C. Ellerbeck, San Leandro, Calif., assignor to Friden Calculating Machine Co., Inc., a corporation of California Application November 7, 1952, Serial No. 319,342
17 Claims. (Cl. 235—63)

This invention relates to calculating machines, and particularly one in which a quotient is automatically inserted into a multiplier storage mechanism, digit by digit as the division progresses, whereby a quotient secured in one operation may be used as a multiplier in a second.

A primary object of the present invention is to provide means for automatically inserting a quotient value into a multiplier storage mechanism, digit by digit, as the division operation progresses.

Another object of the present invention is to provide a mechanism for counting the cycles of operation in division, and providing means for blocking the count in the first subtractive cycle in any ordinal operation, and also to block the count in all addition and shift cycles, thereby providing a nonreversible counter which operates beginning on the second count of an ordinal subtractive operation and ending with the subtractive count that causes the overdraft—thereby avoiding the reversing of the counter conventional in division in which the first subtractive operation is counted and the correction of the overdraft operates to reverse the counter to reduce the value previously inserted therein by "1."

Another aspect of the present invention is to provide a means for setting a control shaft in an angular position representative of the true count of the subtractive operations (i. e., quotient) in each order of a division problem, exclusive of the subtraction causing the overdraft.

Another aspect of the present invention is to provide a mechanism for inserting a value into a multiplier storage, or other selection mechanism, depending upon the angular position of a control member.

These, and further, objects of the invention will be obvious from the reference to the specification and claims which follow, and these, in turn, will be more readily understood by reference to the drawings, in which:

Figure 1:
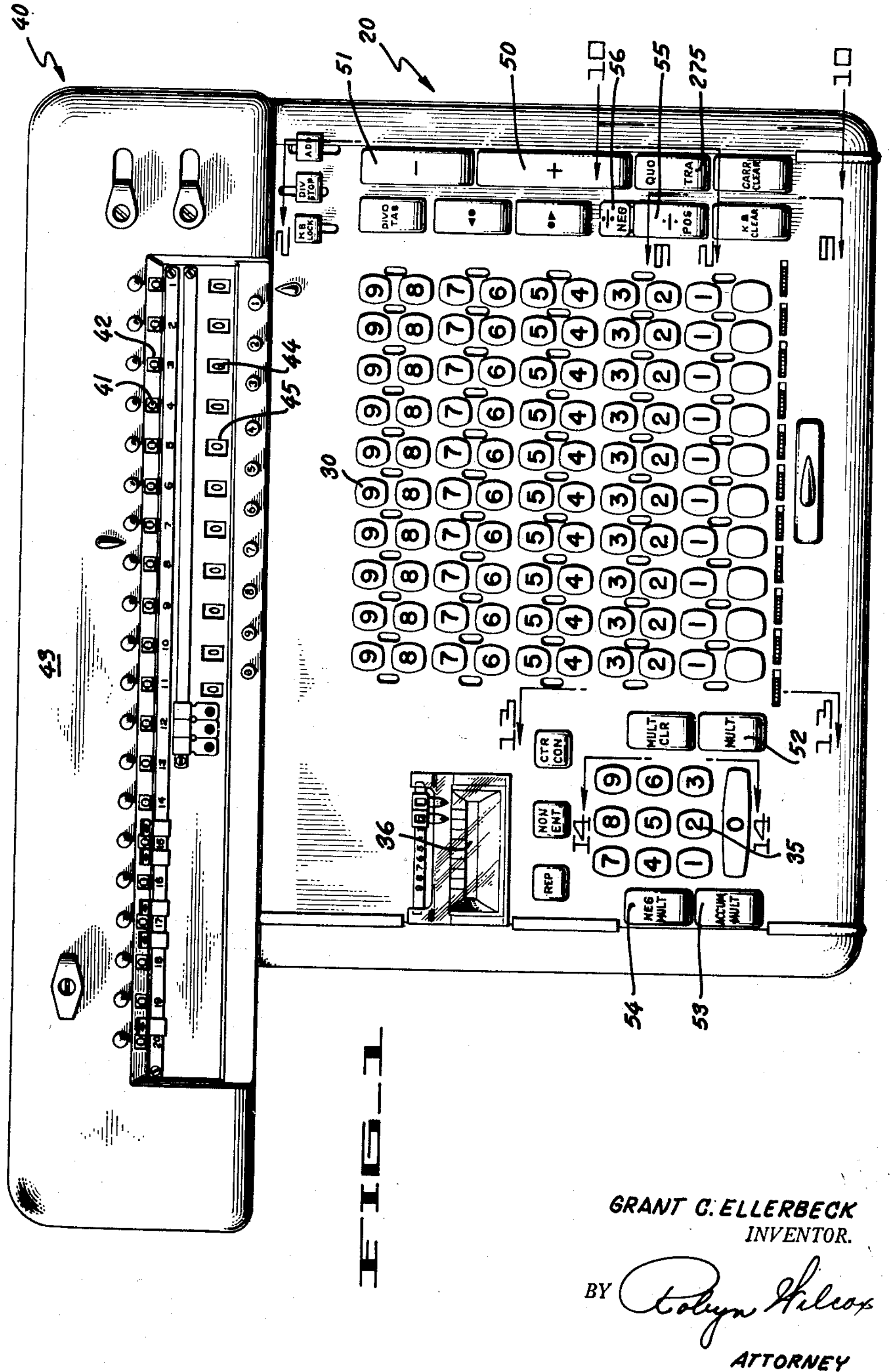
Fig. 1 is a plan view of a conventional calculating machine which, for purposes of exemplification, is used to show the present invention.

The present invention is shown, for purposes of illustration, as mounted upon the conventional "Friden" calculating machine. This machine is manufactured in accordance with the teachings of the patent to Friden, No. 2,229,889, issued January 28, 1941, as modified by the multiplier mechanisms shown in the patent to Friden, No. 2,371,752, of March 20, 1945, and the counter control mechanism described in the patent to Friden, No. 2,294,111 of August 25, 1942.

The machine with which my invention is associated comprises two main portions: a frame 20 (see Fig. 1) and a carriage 40 shiftable transversely of the frame 20. Normally, in machines of this kind, there will be 8 or 10 rows of value keys 30 mounted in the frame, and a corresponding number of actuators, not shown. Associated with these selection mechanisms will be a greater number of register dials 41 (usually about 18 or 20) mounted in the carriage to permit accurate multiplication and division of factors involving 8 or 10 digits. The accumulator register comprises a number of dials 41 having numbers thereon which are viewable through windows 42 in a cover plate 43. Also mounted in the carriage is a counter, or quotient register 44, the values of which are viewable through windows 45 in the cover plate 43.

The keyboard and the other parts of the selection mechanism, the actuating mechanism, and the various controls are mounted in the frame 20 of the machine. The frame comprises a base plate 21 (shown in Figs. 5 and 7) on which are mounted right frame plate 22 (see Fig. 9) and an auxiliary control plate 23 (see Figs. 2, 5 and 7) and a left frame plate 25 and an auxiliary control plate 26 (see Fig. 12). The various mechanisms are driven by an electric motor, not shown.

It will be understood that the mechanism of the present invention is designed to be added to that of a conventional "Friden" calculating machine. The conventional mechanisms of such a machine operate in the conventional way, and therefore will not be described, or mentioned, except insofar as they relate to the present invention, or their operation is modified by the present mechanism. It can be noted, however, that values inserted in the keyboard keys 30 can be added into the accumulator register 41 by depression of a plus key 50 or subtracted from such accumulator register by depression of the minus key 51.

Also, a value set in the keyboard keys 30, as a multiplicand, can be multiplied by a factor set into the multiplier selection keys 35, as by depression of the multiply key 52, the accumulate multiply key 53, or the negative multiply key 54—in which case the product appears in the accumulator dials 41 and the multiplier appears in the counter, or quotient, dials 44. Similarly a dividend registered in the accumulator dials 41 may be divided by a divisor placed in the keyboard keys 30 by depression of the divide key 55, or if the complement of the quotient is desired, by the negative divide key 56—the quotient appearing in the counter dials 44.

My invention relates particularly to a mechanism selectively operable to register a true quotient in the muliplier mechanism the same as if placed there manually by depression of the multiplier value keys 35. In the machine referred to, the multiplier factor will appear in the multiplier check dials 36. Thereafter this value can be stored as long as desired and then used, or can be immediately used in the next operation, by depression of the various multiplier control keys 52, 53 or 54.

The multiplier unit of the machine with which my present invention is associated is substantially that shown and described in the patent to Friden, No. 2,371,752 and need not be described herein. This unit or mechanism is conventionally mounted in the lower left-hand corner of the frame of the machine, as shown in Fig. 1, and includes the value keys 35 mounted on depressible key stems 37 shown in Figs. 12 and 14. The various multiplication operations are controlled by the keys 52, 53, 54 abovementioned. Depression of the various value keys 35 is operative, as shown and described in said patent, to set a value pin in each order of a multiplier pin carriage, the setting of the pin determining the number of times the machine is cycled in each order of a multiplication operation. Associated with the pin carriage is an escapement mechanism operative to step the pin carriage one order to the left upon the insertion of each value thereinto. This escapement mechanism includes a shaft 60 (shown in Fig. 12) operated by the zero key 35 (shown in Fig. 1). An escapement control arm 61 is rigidly secured to the shaft 60, whereby the rocking of the shaft 60 (counter-clockwise when viewed from the front of the machine) depresses the left end of the arm 61 to operate the escapement mechanism for a single step to the left.

My invention is operative to set values, and particularly quotient values, into the multiplier selection mechanism and simultaneously operate the escapement mechanism for a single step of the pin carriage to the left, or alternatively (when the value is "0") to operate the escapement mechanism alone. Means will be described hereafter, in the proper place in the description of my invention, for depressing the key stems 37 and rocking the escapement shaft 60. In other respects, however, the multiplier mechanism of the patent above-described remains unchanged.

Figures 2, 3, 4:
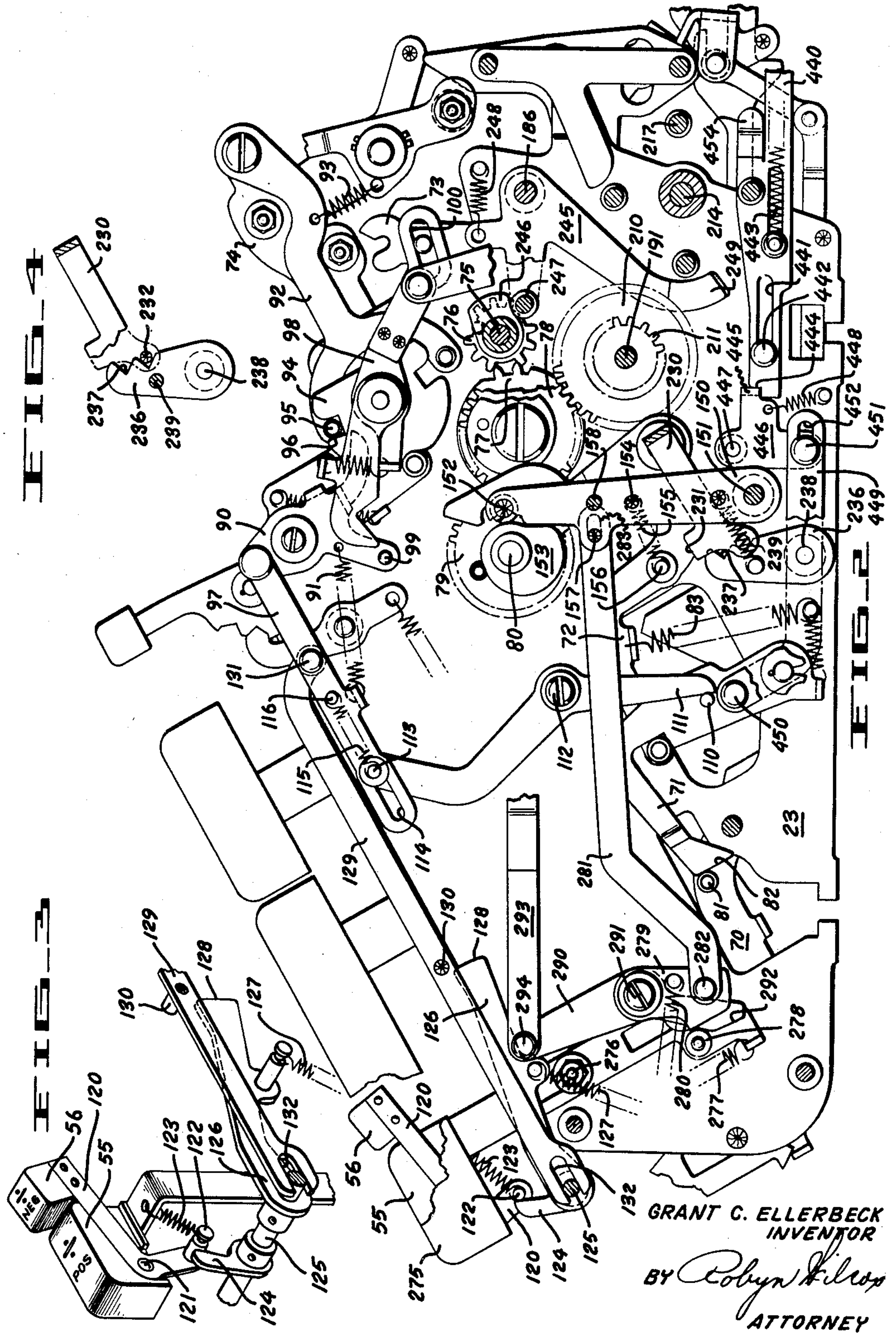
Fig. 2 is a right-side view of the mechanisms mounted on the right-hand auxiliary control plate of the machine shown in Fig. 1, and illustrating certain portions of the mechanism of my present invention.
Fig. 3 is a detail shown in isometric projection, of the division control key mechanism.
Fig. 4 is a detail of a portion of the mechanism shown in Fig. 2.

The division mechanism of the machine with which my invention is shown is fully described in the above-mentioned patent to Friden, No. 2,229,889, and its operation will be understood from a reference to that patent. It can be mentioned, however, that the depression of the division key 55 is operative through means there shown to translate a slide 70 (see Fig. 2) rearwardly. Movement of the slide is operative (by means of roller 81 thereon engaging the face 82) to rock the latch member 71 clockwise. The rocking of the latch 71 releases the division control trigger 72 which is resiliently urged in a counter-clockwise direction by a strong spring 83. The rocking of the power trigger 72 is operative to initiate a division operation, including the rocking of the division control link 73 (counter-clockwise as shown in Fig. 2), so that the bifurcated rear end thereof engages a stud on digitation control slide 74 to control the additive and subtractive operation of the machine in the following sequence of operations. The rocking of the control link 73 starts the machine in a sequential series of subtractive operations which is terminated in any order by an overdraft mechanism, not here shown. The overdraft mechanism is operative to translate a control shaft 75 to the right, at the end of the cycle of operation in which the overdraft occurs. Mounted on the right end of the shaft 75 is the mutilated control gear 76 which carries three sets of three teeth each, as fully described in said patent. When the shaft and gear are translated to the right the gear 76 is placed in the plane of the driving gear 77, which is provided with two teeth. The mutilated driving gear 77, in turn, is secured to an idler 78 which is driven by a driving gear 79 rigidly secured to the drive shaft 80. Thus the mutilated driving gear 77 rotates constantly while the machine is in operation. When an overdraft occurs the gear 76 is translated outwardly, or to the right when viewed from the front of the machine, placing it in the plane of the driving gear 77. This occurs just before the end of a cycle, and as the machine comes to the full-cycle position, the two teeth on the gear 77 engage the three teeth on the gear 76, rotating the latter a portion of a revolution. It can be noted at this point that the driven mutilated gear 76 is not given a full one-third of a revolution in this cycle. The gears 76 and 77 are shown in their full-cycle position. It will be obvious that at the end of the cycle causing the overdraft the middle tooth of the first group of three teeth of gear 76 will lie between the two teeth shown on gear 77, a rotation in that cycle of about 60°. At the beginning of the next cycle of operation (which follows immediately) the remainder of rotation of gear 76 to the 120° position takes place. The resultant rocking of the shaft 75, through a cam arrangement not shown herein, is operative to move the control link 73 to place the machine in an additive position for a single cycle, so that the value which caused the overdraft can be added thereto in order to correct it. At the end of that cycle of operation and the beginning of the next one, the mutilated driving gear 77 gives the mutilated driven gear 76 a full third of a revolution to move the control link 73 to a neutral position, whereupon the carriage 40 is shifted one ordinal space to the left in order to enable the initiation of a series of subtractions in the next lower order. At the end of this second cycle the mutilated driving gear again gives the mutilated driven gear an increment of rotation to rock link 73 to the subtractive position, leaving the gear a little short of its full-cycle position. However, the first few degrees of rotation in the next cycle of operation (the first subtractive cycle in the new order) returns the mutilated driven gear 76 to its full-cycle position. Thereby this cycle of operation last mentioned is operative to again initiate subtraction of the keyboard value from the value standing in the aligned orders of the accumulator register. It must be noted particularly that in the machine with which my invention is preferably associated, the mutilated program gear 76 has not returned to its full-cycle position at the start of the machine cycle which initiates a series of subtractions in the new order. While it is normally understood that the mutilated gear 76 is given a full third of a revolution in each of these cycles of operation, it must be understood that actually the movement is somewhat short of this, and that if the machine were stopped at the end of the shifting cycle the teeth of the driven gear 76 would be in mesh with the two teeth of the driving gear 77 (which would be in the position shown in Fig. 2). Thus, the mutilated gear 76 is out of its home position at the beginning of the next cycle of operation, and returns to its home position in the first few degrees of rotation in that cycle. This timing is important in the present invention as it enables me to temporarily block operation of my new counter at the start of each first subtractive cycle in any order.

Preferably my invention is associated with a counter control mechanism such as that shown in the patent to Friden, No. 2,294,111, above mentioned, for controlling the operation of the counter register 44 to a like or unlike sign character with reference to the accumulator 41. Such a mechanism comprises a control bellcrank 90 which is biased (clockwise in Fig. 2) by suitable spring 91 to a like counting position. A counter control, Y-shaped link 92 is pivotally mounted on the digitation control slide 74, being biased in a counter-clockwise direction by a suitable spring 93. Each of the diverging arms of the link 92 is provided with a pin 95 which is adapted to seat in an associated slot 96 of a control member 94. The control member 94 will be rocked, clockwise or counter-clockwise as the case may be, by movement of the digitation control slide 74, the direction of rotation depending upon whether the upper or the lower pin 95 is in engagement with its cooperating slot 96, and whether the control slide 74 is moved forwardly or backwardly. Rocking of the control bellcrank to its normal clockwise position shown in Fig. 2, permits the upper pin 95 to engage the slot 96, thereby providing for like registration in the counter register as compared to registration in the accumulator register 44. The bellcrank can be rocked by a suitable link 97, and when rocked counter-clockwise the lower arm of the bell-crank rocks the upper pin 95 out of engagement with its slot 96 and causes the engagement of the lower pin 95 with its associated slot. In division operations the rocking of the control link 73 is operative, through a pin and slot connection 100, to rock a locking arm 98, the nose of which engages a pin 99 on the control bellcrank 90, thereby locking the bellcrank in either adjusted position.

Normally depression of the division key 55 is operative to position the counter control mechanism for unlike registration, so as to give a true quotient (the true quotient being secured by counting in a positive direction during the subtractive cycles of the accumulator). This can be secured in my invention by a pin 110 riveted on, or otherwise rigidly secured to, the latch member 71. The pin 110 engages the lower end of a two-armed lever 111 which is pivoted to the side frame 23 by any suitable means, such as screw 112. The upper arm of the lever 111 carries a pin 113 which is embraced within a slot 114 in the forward end of the control link 97. A spring 115 tensioned between the pin 113 and a stud 116 on the link 97 causes the lever and link to lie in their retracted positions shown in Fig. 2. It is obvious that as the latch member 71 is rocked (clockwise in Fig. 2) the lever 111 is rocked counter-clockwise. The tension of spring 115 is sufficient to pull the link 97 forwardly, rocking control bellcrank 90 counter-clockwise to lift the counter control arm 92 to the unlike registration position.

However, if desired, the complement of the true quotient can be secured by depressing the negative division key 56, shown in detail in Fig. 3. As shown in this figure, the negative division key 56 is mounted on a bellcrank 120 which is pivotally mounted on the side of the division key 55 by any suitable means, such as pin 121. The bellcrank 120 and the negative division key 56 are urged in an upward direction (counter-clockwise direction in Figs. 2 and 3) by a suitable spring 123 tensioned between a stud 122 on the lower arm of the bellcrank 120 and the stem of key 55. Associated with the bellcrank 120 is an arm 124 abutting the pin 122. The arm 124 is pinned, or otherwise rigidly secured, to a stub shaft 125. A blocking arm 126 is also pinned, or otherwise rigidly secured, to the stub shaft 125, and extends rearwardly as shown in these figures. The arm 126 is urged in a clockwise direction by a suitable spring 127, which causes the short arm 124 to abut the pin 122. The first motion caused by depression of the key 56 will be to rock the bellcrank 120, thereby rocking the arm 124, shaft 125 and blocking arm 126 (counter-clockwise in Figs. 2 and 3). This rocking of the bellcrank 120 and the related parts is due to the fact that the division key 55 is normally urged to its raised position by a spring considerably stronger than springs 123 and 127. The rocking of the arm 126 to raise the rear end 128 thereof, causes the rear end 128 to come in front of a blocking pin 130 on control link 129. The control link 129 is pivotally mounted on the control link 97 by any suitable means, such as pin, or stud, 131, and the forward end of the link 129 is slotted as at 132 to embrace the stub shaft 125. Thus, the depression of key 56 is operative to rock the arm 126 up into blocking engagement with pin 130, thereby preventing forward translation of link 129 and control link 97 to which it is pinned. Thus, the rocking of the lever 111 will cause the spring 115 to yield, the arm 97 being blocked in the like registration position. Normally, however, it will be understood that the rocking of lever 111 will be effective to move link 97 forwardly to cause an unlike registration. It is obvious that after the bellcrank 120 has been rocked by the depression of the negative division key 56 to a position where the arm abuts against the shoulder of the stem of the division key 55, the further depression of key 56 will cause depression of the key 55 to initiate a division operation (the counter control mechanism then being locked in such like digitation position).

The mechanism of the present invention may be more readily understood if first the theory of operation is explained. Basically, I propose to count the cycles of machine operations in division, excluding the initiatory cycle, the corrective addition cycle, the shift cycle, and the first subtractive cycle in any order of operation (which also excludes all cycles of a division aligning phase in the machine shown which is similar to that disclosed in the patent to Machado No. 2,653,765, issued September 29, 1953). A number of suitable counting means could be suggested, but I prefer to use the simple device shown in the drawings, which operates from a cam on the drive shaft rocking a follower arm in each cycle of operation. A positionable interponent arm is associated with the follower arm, and in one position is rocked by the rocking of the follower arm, and in its other position is disengaged therefrom. The position of the interponent arm depends upon the position of a control arm, the position of which is controlled by a cam on the division control shaft 75. By this means, whenever the division control shaft 75 is rocked from its full-cycle position shown in Fig. 2, the control arm is positioned to disable the interponent arm previously mentioned. It will be recalled that this arm is rocked at the end of the cycle causing the overdraft and does not return to its full-cycle position until after the start of the first subtractive cycle in the next order. This permits the interponent arm to be disabled, or disconnected from the follower arm, during the additive corrective cycle, the shift cycle and the start of the first subtractive cycle in any order. In addition, means are provided for disabling the interponent in the initiatory cycle of a division operation. When the interponent arm is in its operative position it will rock with the follower arm and thereby operate a ratchet tooth to rotate a shaft a single step for each cycle of operation—preferably a tenth of a revolution, or approximately 36°. At the end of the division operation in any order, the angular position of the shaft will be used to determine the actuation of a multiplier key 35 corresponding to the value determined by the number of counts in that ordinal series of operations. This can readily be secured by means of a bail operated during the additive corrective cycle, which bail is effective to operate an interponent member placed in operative position by the angular position of the shaft and operative to depress the corresponding multiplier key. Then, in the next cycle of operation, the shaft and its related interponents are returned to the "0," or full-cycle, position so that a count can again be made in the next succeeding ordinal series of operations. The mechanism for operating the interponent bail to insert the value determined by the angular position of the shaft into the multiplier mechanism and to operate the clearing, or zeroizing, means is preferably controlled by the division programming mechanism and operated by a pin wheel driven from the drive shaft and in synchronism therewith.

*Cycle counting mechanism.*—The counter operator arm is shown particularly in Fig. 2. In my preferred form it comprises an arm 150 pivotally mounted on the auxiliary control plate 23 by any suitable means, such as stud 151. The upper end of the counter arm 150 is provided with a suitable roller 152 which engages the peripheral edge of a cam 153 mounted on the right end of the main drive shaft 80. This cam is preferably so formed that in the home, or full-cycle, position of the parts, the roller 152 engages the edge of the cam at the point of minimum radius, the cam increasing in radius to approximately the 270° position, after which it rapidly drops to its minimum radius. Thus, the arm 150 is rocked slowly (clockwise in Fig. 2) from the start of a cycle of operation to a point approximately three-fourths the way through the cycle, after which it is snapped back to the counter-clockwise position by suitable spring such as 155 tensioned between a stud 154 on the arm 150 and a corresponding stud 156 on the division initiating trigger 72.

Figures 5, 6:
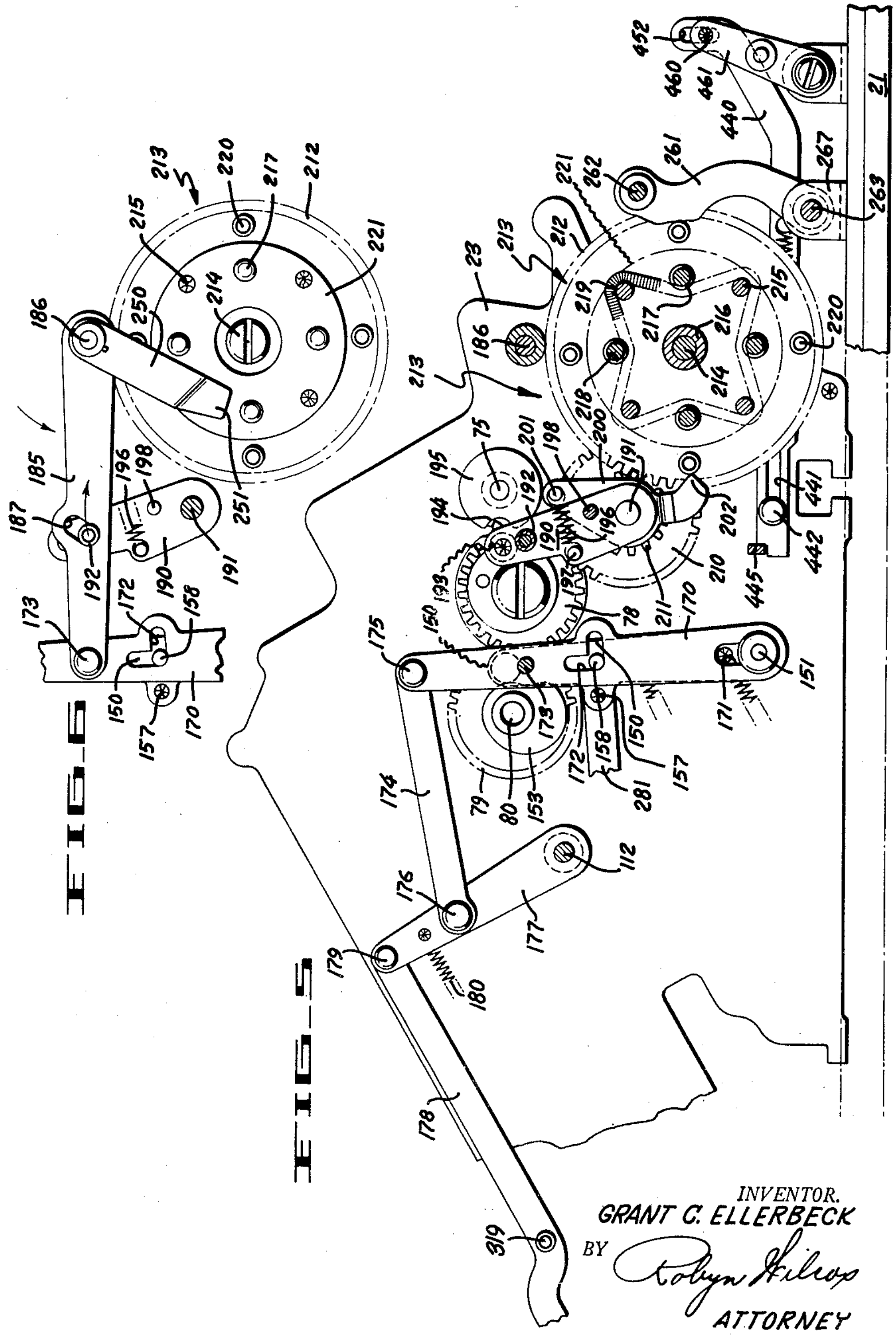
Fig. 5 is a right-side view of the control plate of the machine, showing mechanisms mounted immediately to the right, or outside, of that shown in Fig. 2.
Fig. 6 is a detail of certain parts closely related to mechanisms shown in Fig. 5.

In view of the fact that many cycles of operation cannot be counted, I prefer not to directly operate the counting mechanism from the arm 150, but to use an interponent arm 170 associated therewith. The arm 170, as shown particularly in Fig. 5, is likewise pivotally mounted on the stud 151. As shown in Fig. 5, the interponent arm 170 is provided with a slot 171 at its lower end which embraces the pivot stud 151, thereby permitting the arm 170 to be raised or lowered with relation to its pivot point. The arm 170 is provided at an intermediate point with an L-shaped slot 172 that embraces a pin 158 riveted, or otherwise rigidly secured, to the counter arm 150. It would be obvious that when the interponent arm 170 is in its raised position the pin 158 can reciprocate idly in the horizontal portion, or base, of the L-slot, without rocking the arm 170. However, when the arm 170 is dropped to enable the pin 158 to be embraced in the upright portion of the L-slot, then the reciprocation of arm 150 and pin 158 with each cycle of machine operation will be operative to impart a similar reciprocation, or oscillation, to the interponent arm 170. At this point it can be noted that the upper end of the arm 170 is pivotally connected to a link 174 by any suitable means, such as pin 175. The forward end of the link 174 is pivotally secured to an arm 177, as by pin 176. The arm 177 is rockably mounted on the stud 112 which also supports the counter control arm 111 previously described. The upper end of the arm 177 is pivotally connected to a counter link 178 by any suitable means, such as stud 179.

Reciprocation of the link 178 is operative to oscillate the counting ratchet briefly mentioned above, which will be described hereafter.

The position of the interponent arm 170 is controlled by an arm 185 (shown in Fig. 6) which is pivoted on a stud 186 rigidly affixed to the auxiliary frame plate 23. The forward end of the arm 185 is pivotally connected to the interponent arm 170, as by stud 173, whereby the rocking of the arm 185 is operative to raise and lower the interponent arm 170 to its inoperative or operative positions, respectively. The arm 185 is provided with a diagonal camming slot 187 intermediate its ends which slot embraces a roller 192 carried by a control arm 190.

The control arm 190 is pivotally mounted on a stub shaft 191 and is provided at its upper end with a cam follower roller 193. The roller 193 is adapted to engage the peripheral edge of a cam 195 mounted on the right end of the division control shaft 75. This cam has a single depression 194, so located that when the shaft 75 and cam 195 are in their home, or full-cycle, positions, the depression 194 lies opposite the follower roller 193. However, as soon as the division control shaft is rocked out of its full-cycle position, the follower roller 193 engages the outside edge of the cam and forces the camming arm 190 to the left. When the cam arm 190 is in its rocked, or counter-clockwise, position shown in Figs. 5 and 6, the roller 192, cooperating with the slot 187 forces the forward end of the arm 185 upwardly, thereby lifting the interponent arm 170 to the position shown in Fig. 5. However, when the follower roller 193 is seated in the depression 194 of the cam 195, the arm 190 is rocked clockwise from the position shown in Figs. 5 and 6, whereupon the roller 192 and slot 187 cooperate to depress the forward end of the arm 185, thereby depressing the interponent arm 170. In the latter position the stud 158 on the oscillating arm 150 is embraced within the upright portion of the L-slot 172, and rocks the arm 170 simultaneously with the rocking of the arm 150.

The cam 190 is provided with a stud 197 upon which is seated a strong spring 196, the other end of which is seated on a stud 201 rigidly mounted on a two-armed lever 200. The two-armed lever 200 is also pivotally mounted on the stub shaft 191, and is rocked momentarily clockwise when in the full-cycle position shown in Fig. 5. The rocking of the lever 200 occurs for a brief instant as the mechanism of the calculator returns to the full-cycle position, by means of its nose 202 engaging a roller 220 mounted on a gear 212 of the pin-wheel assembly 213, which will next be described. It should be noted, however, before passing to the pin wheel 213, that the momentary rocking of arm 200, strongly biases the control arm 190 to the right to seat the roller 193 in notch 194, thereby tending to depress the interponent 170 to its active position.

The pin-wheel assembly 213 shown in Figs. 5, 6, 7 and 8, is driven from the main drive shaft 80 through the medium of gear 79 mounted thereon and idler 78 previously mentioned. The idler 78 meshes with an idler 210 (shown in Fig. 5). This idler is rotatably mounted on the stub shaft 191 previously mentioned, and has affixed thereto a smaller gear 211. The gear 211 meshes with the large gear 212 of the pin-wheel assembly 213. It can be noted at this point that in the preferred form of my invention the gear ratio in the gear train just mentioned will be such that the large gear 212 will rotate through an angle of 90° for each cycle of operation. It can also be noted that this gear rotates in all operations of the machine as it is directly geared to the main drive shaft 80.

The pin-wheel assembly 213 comprises the large gear 212 which is rotatably mounted on a screw 214. Spaced a short distance to the right thereof is a smaller plate 221, the latter being affixed to the gear by suitable spacing rivets 215 and the collar 216 shown in Fig. 5. The plate 221 and gear 212 has four apertures reamed therethrough, in which are inserted slidable pins 217. The pins are provided with a pair of grooves 218 associated with which is a tensioned spring 219 looped around the spacing studs 215 and pins 217, to hold the latter in either adjusted position. It can be mentioned that normally the pins are retracted, or pushed to the left, and are ejected, or pushed to the right, in order to control the operations of the present invention. The pin-wheel assembly also carries four equally spaced rollers 220, preferably mounted on the larger gear 212 as shown in these figures.

The rollers 220 are so located that in the full-cycle position of the parts one of these rollers will engage the nose 202 of the rocking lever 200, rocking it clockwise in Fig. 5 to its operative position, as shown in this figure. When this occurs the spring 196 places a strong bias on the cam arm 190 to urge it to the right into the detent 194 of cam 195. It can be noted that this rocking of the lever 200 occurs at the full-cycle position of each cycle of operation, thereby momentarily placing a strong bias upon the arm 190 to position the interponent arm 170 to its operative position. As indicated above, the rocking of arm 190 is blocked by the cam 194 in the additive corrective cycle and in the shifting cycle of each divisional operation. Also, as this cam, and shaft 75 on which it is affixed, have not returned to the full-cycle position at the beginning of the first subtractive cycle in each order of operation, the cam will be operative to hold the arm 190 in its inoperative position at that time, thereby blocking operation of the counter arm 170 in the first subtractive cycle of each order of a division operation. It can be noted that in addition to the bias being a momentary one, the arm 190 is held in its counter-clockwise position until the end of this cycle of operation by two other means: the detent which holds bellcrank 230 (Fig. 8) in its counter-clockwise position when the bias is removed, and the movement of arm 150 at the start of the cycle moving stud 158 into the horizontal portion of slot 172, thereby preventing depression of interponent 170 until the end of that cycle. However, in the second subtractive cycle of operation the cam 194 will have returned to its home position so that the roller 193 can then enter the depression 194 in the cam, thereby permitting the arm 190 to be rocked clockwise (from the position shown in Fig. 5) by the rocking of lever 200 and the tension of spring 196.

In the subtractive cycle which causes an overdraft the lever 200 will have been rocked by a roller 220 at the initiation of the cycle. At this time, however, the follower roller 193 is seated in the cam depression 194, which remains in its home position until the overdraft occurs late in that cycle. At this time the shaft 175 is pushed to the right by the overdraft mechanism and as the cycle comes to a close the shaft and cam 195 are rotated by the mutilated gear 77 previously mentioned. Thus, the interponent counting arm 170 is not disabled until the end of the cycle which causes the overdraft. This series of operation gives the correct quotient in that order of operation—the disabling of the first count and enabling of the count which causes the overdraft providing the same count as the conventional method of counting the first subtraction and the one that causes the overdraft and then subtracting "1." The present method has the decided advantage that it is not necessary to reverse the counter to subtract "1" from the count.

Means are also provided for blocking the operation of the interponent counting arm 170 in the cycle which initiates a division operation. This is controlled by a bellcrank member 230, also mounted on the stub shaft 191, to the right, or outside, of the members previously mentioned thereon. This bellcrank 230 is shown in full in Fig. 8, and the forward end thereof is shown in Fig. 2, and the rear end thereof in Fig. 7. The forward end of the bellcrank 230 is provided with a projection, or nose, 231 that lies in the path of travel of a stud 156 on the division initiating trigger 72 (as shown in Fig. 2). The forward end of the bellcrank is also provided with a detent pin 232 engaging notches 237 in detent arm 236. The detent arm 236 is pivotally mounted on the auxiliary frame plate 23 by any suitable means, such as stud 238. A spring 239 tensioned between studs on the detent arm 236 and the actuating arm 150, pulls the detent arm 236 into engagement with the pin 232 on bellcrank 230, thereby resiliently holding the bellcrank 230 in either adjusted position. The rear end of the bellcrank 230 extends downwardly and rearwardly (as shown particularly in Fig. 8) and is provided with a cam tip 233. The cam tip 233 will, when the bellcrank 230 is rocked to its counter-clockwise position shown in Fig. 8, lie in the path of travel of the pins 217. This cam tip 233 will engage a projected pin 217 shortly after the start of the cycle, if the bellcrank 230 is in this rocked position, forcing such pin to its inner, or retracted, position. However, when the bellcrank 230 is rocked clockwise from the position shown in Fig. 8, the tip 233 will lie outside of the path of travel of the projected pins 217, and thereupon the projected pin is permitted to remain in its operative, or projected, position.

The bellcrank 230 is provided with a shoulder 234 (shown particularly in Fig. 8) which abuts against a stud 198 mounted on the control arm 190. When the bellcrank 230 is rocked (counter-clockwise in these figures) upon the initiation of a division operation by the release of division initiating trigger 72, the shoulder 234 rocks the stud 198 and arm 190 (counter-clockwise in Figs. 5, 6 and 8) to hold the arm 190 away from the cam 195. This positively holds the interponent counting arm 170 in its raised position shown in Fig. 5, as a result of which it is inoperative to effect a count in the transfer mechanism in this cycle.

The setting of the pins 217 of the pin-wheel assembly 213 to control the programming of the transfer of a quotient value to the multipler unit is caused by a bellcrank 245 (shown in Fig. 2) pivotally mounted on the auxiliary frame plate 23 by any suitable means, such as the stud 186 upon which the arm 185 is also mounted. The forward arm of the bellcrank 245 carries a roller 247 which engages the periphery of a cam 246 mounted on the division control shaft 75, immediately to the right of the mutilated control gear 76 and to the left of the cam 195. The bellcrank 245 is biased into engagement with the cam 246 by a spring 248 tensioned between the bellcrank and a suitable stud on the auxiliary frame plate 23. The cam 246 and bellcrank 245 are shown in their full-cycle positions in Fig. 2. It is obvious that immediately after the rotation of the division control shaft 75 begins, the bellcrank 245 is rocked counter-clockwise and held in its rocked position for most of the overdraft correcting cycle. The lower arm of the bellcrank 245 is provided with a cam tip 249 which lies behind the pin wheel 213. In the full-cycle position the cam tip 249 lies outside of the path of travel of the pins 217 (as shown in Fig. 2). However, when the bellcrank is rocked (counter-clockwise when viewed from the right as in this figure) the camming nose 249 is moved into the path of travel of the pin wheels 217, so that immediately after the pin leaves its full-cycle position it is cammed outwardly, to the right when viewed from the front of the machine, to its operative position.

It will be recalled that when the bellcrank 230 is in its counter-clockwise position its camming tip 233 also lies in the path of travel of the projected pin 217, and as this tip lies immediately below the camming tip 249 a projected pin will be forced into its withdrawn, or inoperative, position. However, if the bellcrank 230 is in its clockwise position, whereby its camming tip 233 is outside of the path of travel of the pins 217, then a pin 217 projected by the operation of the bellcrank 245 will remain in its projected position until the fourth cycle of operation when it is forced to its withdrawn, or left-hand, position by a fixed cam 250 (shown in Figs. 6 and 8), the camming tip 251 of which lies in the path of travel of the pins 217. By this means it is impossible for a projected pin 217 to make more than one cycle of operation. It can be noted at this point that the projected pin 217 is effective to first operate the mechanism for setting the value in the transfer shaft into the multiplier mechanism, and secondly to clear the value from this shaft so that a new value can be placed therein in the next order of operation.

Means must also be provided for disabling the counting mechanism heretofore described in normal division operations, when it is not desired to transfer the quotient into the multiplier mechanism. This can be accomplished by means of a bellcrank latch 260 (seen in Fig. 7). This bellcrank 260 is pivotally mounted on a rocking arm 261 by any suitable means such as stud 262. The arm in turn is pivotally mounted, as by screw 263, on a bracket 267 secured to the base plate 21 of the machine. The rocking arm 261 is provided with a contact face 266 which engages one of the rollers 220 when the pin wheel 213 is in its full-cycle position, and immediately before and after this point. Thus, at the full-cycle position the arm 261 is rocked by the roller 220 (clockwise in Fig. 7) pulling the latching bellcrank 260 with it. The bellcrank 260 is urged in a counter-clockwise direction and the upper end of the rocking arm 261 is urged to the left, or front, of the machine by a suitable spring 264 tensioned between one arm of the bellcrank 260 and a stud 268 mounted on the cam arm 250. The forward, or left end, of bellcrank 260 is provided with a suitable latching shoulder, or hook, 265 adapted to latch over a stud 235 on the bellcrank 230. Thus, at the full-cycle position the latching arm 260 is pulled to the rear (to the right in Fig. 7) pulling the bellcrank 230 into its disabling position unless the latch arm 260 is rocked to its inoperative position. In the normal position (shown in Fig. 7) the bellcrank 230 is operative to forcibly cam a projected pin into its retracted position, and also its shoulder 234, by engaging stud 198, rocks the control arm 190 to the inoperative position. With the rocking of the arm 190 to the left, or its inoperative position, the intermediate counting arm 170 is raised so that the base portion of the L-slot 172 embraces the pin 158 on the actuating arm 150 and therefore no count is possible.

The disabling of the counter blocking latch 260, to enable the transfer of a quotient into the multiplier mechanism, is under the control of a quotient transfer key 275 which, as shown in Fig. 1, preferably lies immediately to the right of the division key 55 so that the two may be depressed by a single stroke of the hand of the operator. The key stem for the quotient transfer key 275 is suitably mounted on the auxiliary frame plate 23 for substantial vertical movement thereon by any suitable means such as pin and slot connections 276 (Fig. 2). The key and key stem are urged to their raised position by a spring 277 tensioned between an ear on the key stem and a stud on the frame, not shown. The lower end of the key stem carries a roller 278, associated with which is a latching arm 279 pivotally mounted on screw 291. The latching arm is urged in a counter-clockwise direction, to the front of the machine, by a suitable spring 280. An unlatching link 281 is pivotally connected to the latching arm 279 by any suitable means, such as pin 282, the rear end of the link 281 being provided with a slot 283 which embraces a stud 157 carried by the counter arm 150. It is thus evident that in the second half of a cycle of operation the rocking of the arm 150 will translate the link 281 rearwardly, thereby pulling the latch 279 against the tension of its spring to release the quotient transfer key 275. By this time, however, the mechanism controlled by the key to disable the latch 260 will have become operative and the key can be raised in its normal position without changing the setting of the machine or the operations which are caused thereby.

Figures 7, 8:
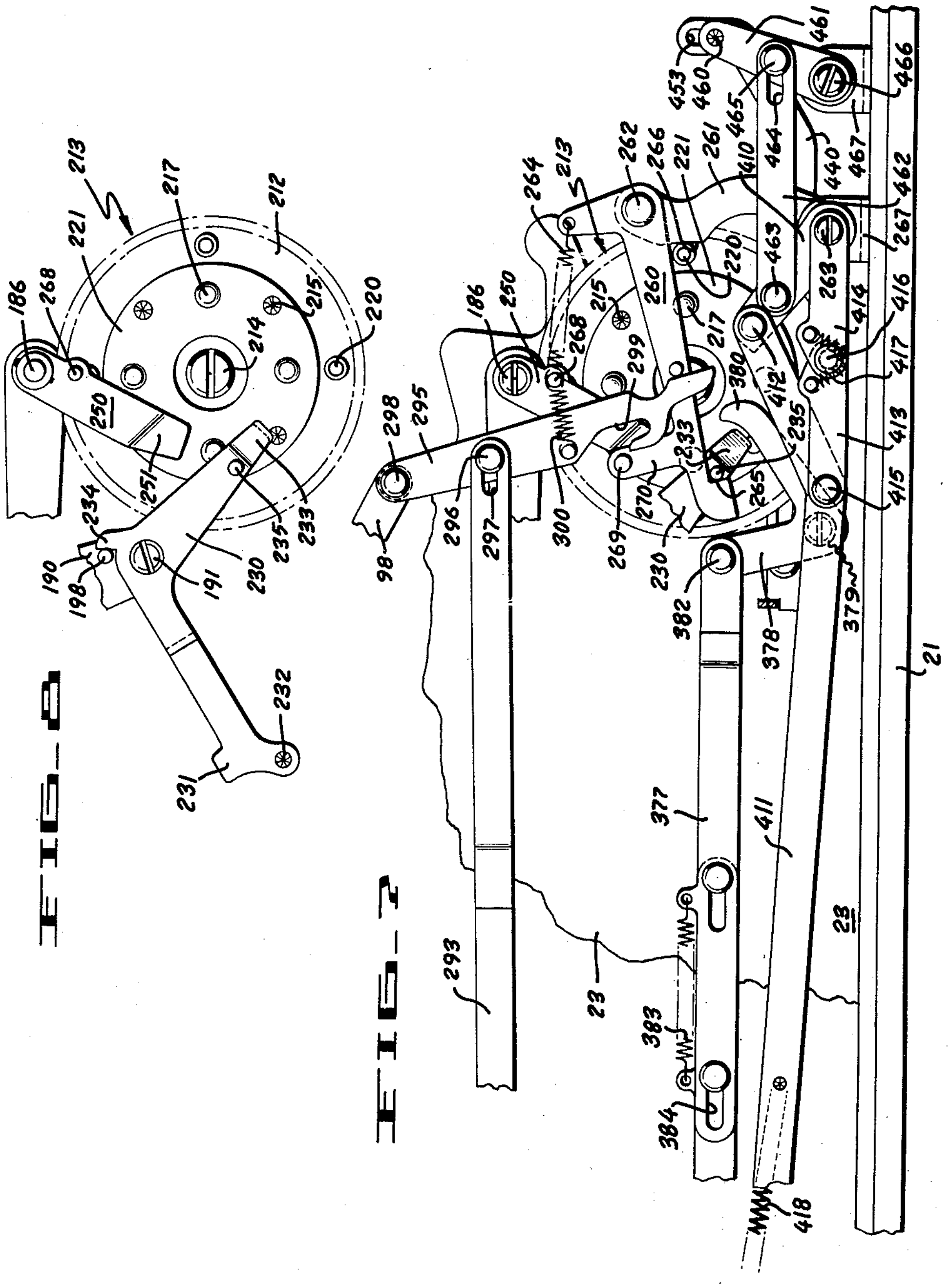
Fig. 7 is another view of the right-side view of the control plate shown in Figs. 2 and 5, showing additional mechanisms mounted to the right, or outside, of those shown in Fig. 5.
Fig. 8 is a detail view of certain control mechanisms shown in part in Fig. 7.

The roller 278 on key stem 275 is also operative to unlatch the disabling latch 260. This can be secured by providing a two-armed lever 290, likewise mounted on the screw 291. The lower arm of this rocker 290 is provided with a cam nose 292 engaged by the roller 278. The depression of transfer key 275 is therefore operable to rotate the rocker (counter-clockwise in Fig. 2). The upper arm of the rocker 290 is pivotally connected to an unlatching link 293 by any suitable means, such as stud 294. The rear end of the link 293 is shown in Fig. 7, and is provided with a slot 297 which embraces a pin 296 carried by an arm 295. The arm 295 is pivotally mounted on the counter latching arm 98 by any suitable means, such as a long stud 298. It will be recalled that the counter latching arm 98 is rocked (counter-clockwise in Fig. 2) by the rocking of the division control link 73 to initiate a division operation. Thus, whenever the counter control latch 98 is rocked upwardly to latch the counter control in either set position, the arm 295 is raised with it. The arm 295 is normally rocked to the rear, or counter-clockwise position, by a suitable tension spring 300 tensioned between a stud on the arm 295 and the stud 268 previously mentioned. The lower end of the arm 295 is provided with a pocket-shaped slot 299 adapted to engage a pin 269 mounted on an extension 270 of the latch 260. Thus, when the quotient transfer key 275 is depressed the link 293 is rocked forwardly, pulling the arm 295 clockwise from the position shown in Fig. 7. In this position the entrance to the pocket-shaped slot 299 embraces the pin 269, and when the arm 295 is lifted by the initiation of a division operation and the rocking of the counter latch 98, the pin 269 is seated in the lower part of the pocket and cannot escape therefrom due to the shape of the pocket slot. By this means the latch 260 is lifted off of the pin 235, and held in the disengaged position as long as the counter latching arm 98 is in its rocked position (i. e., until the machine completes the division operation).

It will be obvious that when the machine is in the full-cycle position one of the rollers 220 will engage the nose 202 of the lever 200 (as shown in Fig. 5). This normally tends to rock the counter control arm 190, clockwise in this figure, into the depression 194 in the cam 195. However, the initiation of division, through the release of the trigger 72, operates through the stud 156 on the trigger and ear 231 on the bellcrank 230 to lock the mechanism and particularly control arm 190 in its inoperative position. In all normal division operations, when the transfer of the quotient to the multiplier mechanism is not desired, the bellcrank 230 is latched in its blocking position by the latch member 260—the latter being urged counter-clockwise in Fig. 7 by the force of spring 264. The bellcrank 230, when in this position is also operative to restore any pin 217 to its inoperative position. It will be recalled that the bellcrank 245 (Fig. 2) will be rocked by the cam 246 at the end of a cycle causing an overdraft. The rocking of this bellcrank 245 is operative to force the approaching pin 217 to its extruded, or operative, position. However, in normal division operations the bellcrank 230, latched in its blocking position, immediately restores the pin to its inoperative position.

However, when the operator desires to transfer the quotient to the multiplier mechanism, the key 275 is depressed prior to, or simultaneously with, the division key 55. The depression of the transfer control key 275 rocks the rocker arm 290 (Fig. 2) and translates the link 293 forwardly. The translation of the link rocks the unlatching arm 295 (Fig. 7) clockwise so that its pocket slot 299 engages the stud 269 on the latch member 260. Immediately after, with the release of the division trigger 72, the rocking of the counter latch arm 98 lifts the unlatching link 95 upwardly, thereby lifting the latch arm 260 to its inoperative position. The counter latch arm 98 is held in its adjusted position until the end of the division operation, so that throughout the division operation the link 295 holds the latch 260 inoperative. The rocking of the bellcrank 230 counter-clockwise by the releasing of the division control trigger 72, holds the counter control arm 190 in its inoperative position for the first cycle of a division operation. In the second cycle the rocking of lever 200, through arm 190, rocks bellcrank 230 clockwise (in which position it is held by its detent 232—236). The arm 261 and latch 260 are rocked with each cycle of operation at the full-cycle position, but when the latch lever 260 is locked in its raised position the bellcrank 230 is permitted to remain in its clockwise position.

In those machines utilizing the division aligning mechanism of Machado, No. 2,653,765, above mentioned, the first cycle of operation results in a simulated overdraft which shifts the division control shaft 75 to its operative position and rotates the mutilated gear 76 and the cams 246 and 195 attached thereto. The bellcrank 245 is in its inoperative position shown in Fig. 2 at the start of the cycle of operation but is rocked at approximately the end of the cycle by the rotation of the cam 246. This rocking occurs at approximately the end of the cycle so that the camming tip 249 thereof will be operative to project the approaching pin 217 to its operative position.

At the start of the second cycle, which is the corrective additive cycle of a division operation, the bellcrank 245 is still rocked by the cam 246 and the lever 200 is again rocked by a roller 220, but at this point the rotation of the cam 195 has moved the depression 194 out of the path of roller 193 on the counter control arm 190. The cam 195 therefore holds the arm 190 in its inoperative position against the tension of spring 196. The third cycle of machine operation is the conventional shifting cycle under the control of the division mechanism, illustrated herein by the shaft 75 and mutilated gear 76. At this point the bellcrank 245 is inoperative, having been returned to its position shown in Fig. 2 by its spring 248—the cam 246 having rotated beyond engagement with the roller 247 on the bellcrank. The lever 200 is rocked at the beginning of this cycle (for it is rocked at the beginning of all cycles by the roller 220) but the control arm 190 is still blocked against movement by the cam 195. This sequence of three cycles is continued until the machine is properly aligned, it being obvious from the description above, that the control arm 190 is blocked by the cam 195 having not yet returned to its full-cycle position at the start of the subtract cycles and having been rotated from its full-cycle position by the simulated, or false, overdraft caused by the aligning mechanism, throughout the aligning phase.

When the machine is properly aligned for a division operation and the machine goes into the dividing phase of division, the counting or transferring mechanism will remain inoperative, for the first part of the first subtractive cycle. At the beginning of this cycle the lever 200 will of course be rocked at the full-cycle position shown in Fig. 5, tensioning spring 196 to bias the control arm 190 to its operative position. However, it will be recalled that the division control shaft 75 has not returned to its full-cycle position until after the start of the succeeding, or first, subtractive cycle. Thus, at the moment that lever 200 is rocked the cam 195 has not returned to its full-cycle position so that the control arm 190 cannot operate. Immediately after the start of this first cycle of operation the cam will return to its normal position, at which time the arm 190 can be rocked (clockwise in Fig. 5) into engagement so that the roller 193 will seat in the depression 194. However, by the time the cam 195 has rotated sufficiently to permit rocking of the arm 190, the rotation of the pin wheel 213 will have moved the roller 220 away from the nose 202 of arm 200 so that the latter arm is no longer rocked. In fact, the roller 220 will move away from the nose 202 of the lever 200 before the arm 190 can rock, so that in actual operation the arm 200 will be rocked counter-clockwise by the force of the spring 196. The arm 190 remains in its inoperative position so that no count can take place at this time. However, when, at the end of the first cycle of subtractive operation in any order, another roller 220 will engage the nose 202 of the lever 200 to rock it (clockwise in Fig. 5), the momentary rocking of arm 200, acting through spring 196, rocks the arm 190 (clockwise in Fig. 5), so that the roller thereon seats in the depression 194 of the cam which is then in its full-cycle position. The rocking of the arm 190 does two things: (1) It cams the arm 185 (Fig. 6) to depress the forward end thereof (rocks the lever 185 counter-clockwise in this figure), thereby depressing the counter control arm 170. Such depression of the counter control arm 170, as previously described, seats the stud 158 on the under arm 150 in the narrow vertical slot 172, and thereafter the arm 170 rocks synchronously with the arm 150. (2) The rocking of the arm 190 is also effective, through stud 198 thereon engaging the ear 191 on the bellcrank 230, to rock the latter to its clockwise position. In this position the nose 233 on the bellcrank lies outside of the path of travel of a projected pin so that thereafter, when an overdraft occurs to operate the shaft 75 and cam 246, the pin set by the arm 245 will remain in its projected position to effect the transfer and clearing operations to be described hereafter. By this means the arm 170 is effective to rock with the transfer arm 150 beginning with the second subtractive cycle and continuing through to the cycle which causes the overdraft—the rocking of the arm 170 thereby giving a true count of the proper number of subtractive operations in that order. Upon the occurrence of an overdraft the rotation of the cam 195 rocks the arm 190 (counter-clockwise in Fig. 5) to disconnect the counter arm 170 from the actuator arm 150, thereby terminating the count until the second subtractive cycle in the next lower order. The rocking of the control arm 190 at this point, however, is not effective to rock the bellcrank 230, and the latter remains in its inoperative position outside of the path of travel of the projected pins 217. However, the rotation of the cam 195 is effective to disable the rocking of the counter arm 170 throughout the additive corrective shifting cycle and the first subtractive cycle in the next order of operation.

Figures 9, 10, 11:
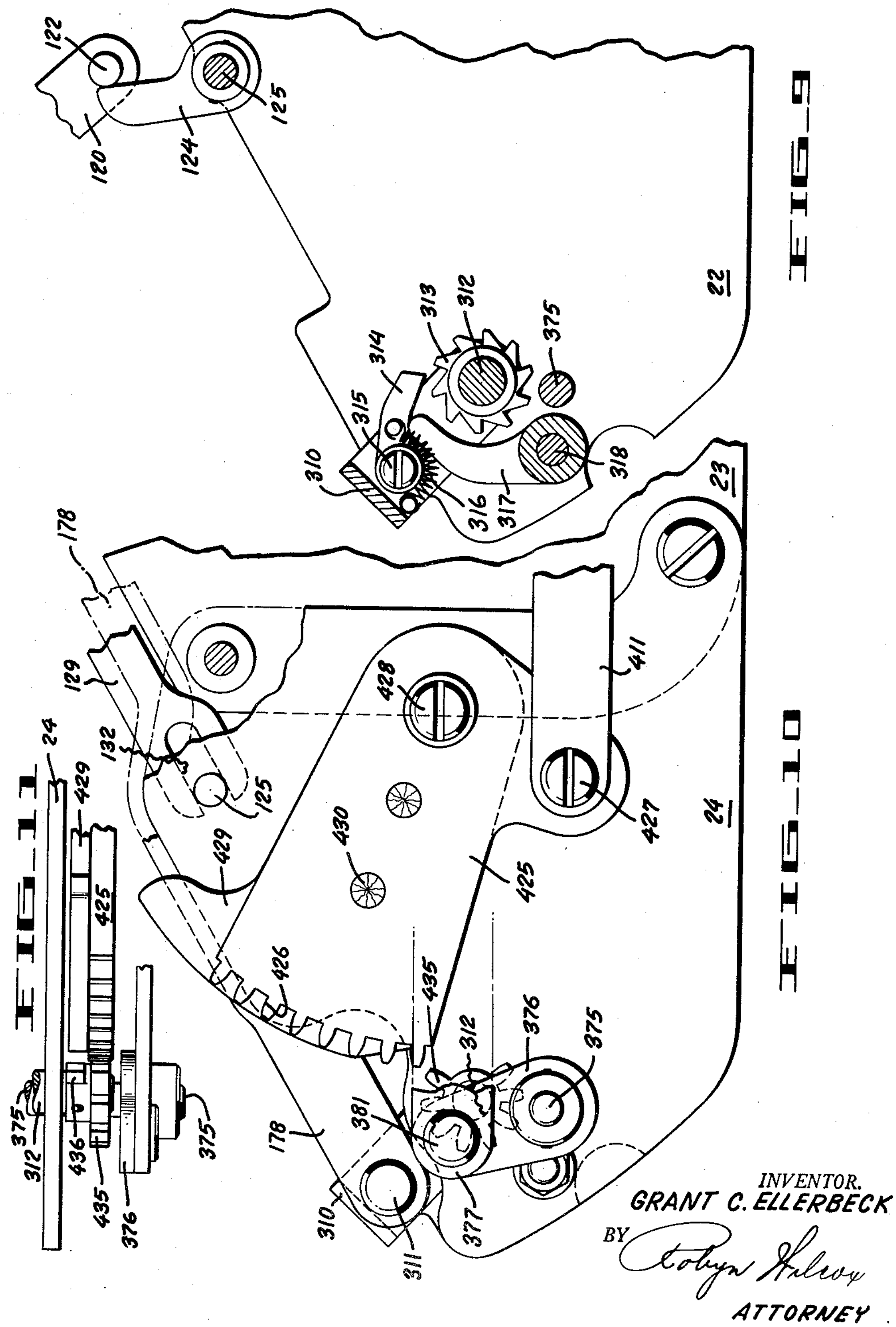
Fig. 9 is a right-side view of the right frame plate of the machine showing particularly the means for setting the count of the subtractive operations, and, in effect, is the forward extension of mechanisms shown in Fig. 5.
Fig. 10 is a partial right-side view of the forward portion of the control plate, and, in effect, is an extension of the mechanisms shown in Fig. 7.
Fig. 11 is a plan view of the mechanisms shown in Fig. 10.

A preferred form of mechanism for transferring the subtractive cycles actuated by the rocking of the counter control arm 190 will now be described. As previously mentioned, the upper end of arm 170 is connected to a second arm 177 by means of a link 174 (see Fig. 5). A second link 178 extends forwardly from the upper end of the link 177. The forward end of the link 178 is pivotally connected to a bail 310 by any suitable means, such as stud 311 (see Fig. 10). The bail 310 is pivotally mounted on a transverse shaft 312, as shown in Fig. 9. A ratchet wheel 313 is pinned, or otherwise rigidly secured, to the transverse shaft 312. A ratchet arm 314 is pivotally secured to the bail 310, preferably on the left arm thereof. This ratchet tooth 314 is pivotally mounted by any suitable means, such as screw 315, and is biased into engagement with the ratchet wheel 313 by a suitable spring 316, as shown. Preferably, I provide a fixed arm 317 rigidly secured to the righthand supporting plate 22, as by stud 318, which arm is effective to lift the ratchet tooth 314 out of engagement with the ratchet wheel when the bail 310 is in its forward position shown in Fig. 9. The link 178 and bail 310 are normally urged to their forward position by the force of spring 180 tensioned between the arm 177 (Fig. 5) and a stud on the frame plate, not shown. However, when the counter arm 170 is lowered into engagement with actuator arm 150, the cam 153 causes a reciprocation of link 178 with each cycle of machine operation, first pulling the bail 310 rearwardly to cause the tooth 314 to engage the ratchet wheel 313 and give it a single increment of motion, and then releasing it to be returned by spring 180.

The link 178 can be provided with a fibre bumper stud 319 shown in Fig. 5 which will abut the rear end of the auxiliary bracket 24 to prevent an overthrow of the link 178 and bail 310.

Figure 12:
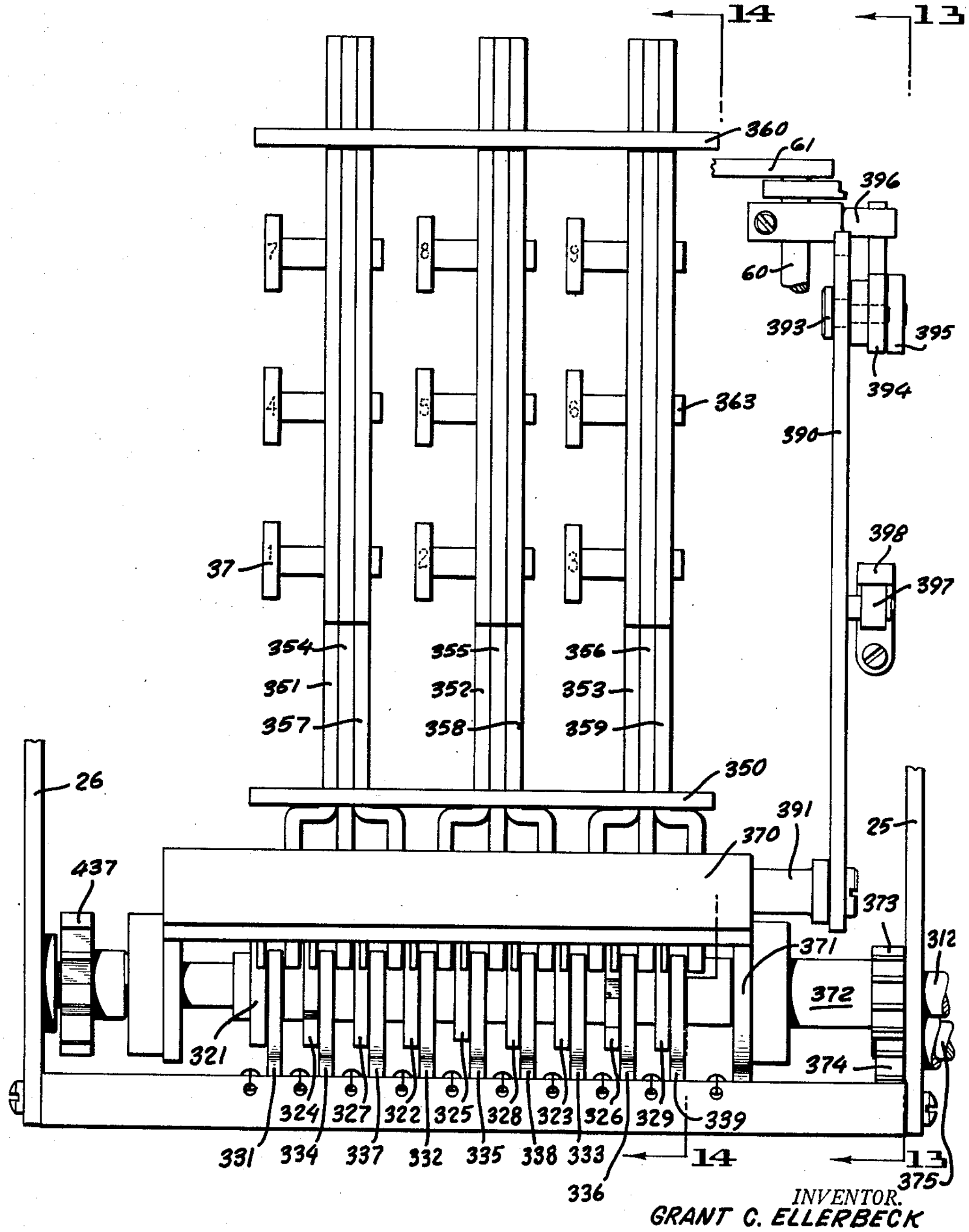
Fig. 12 is a plan view of the multiplier storage unit of the conventional "Friden" calculating machine, with cover removed, showing the key stems of the multiplier storage mechanism and the mechanism (added thereto by my invention) operative to control the insertion of values into the multiplier storage unit.
Figures 13, 14, 15:
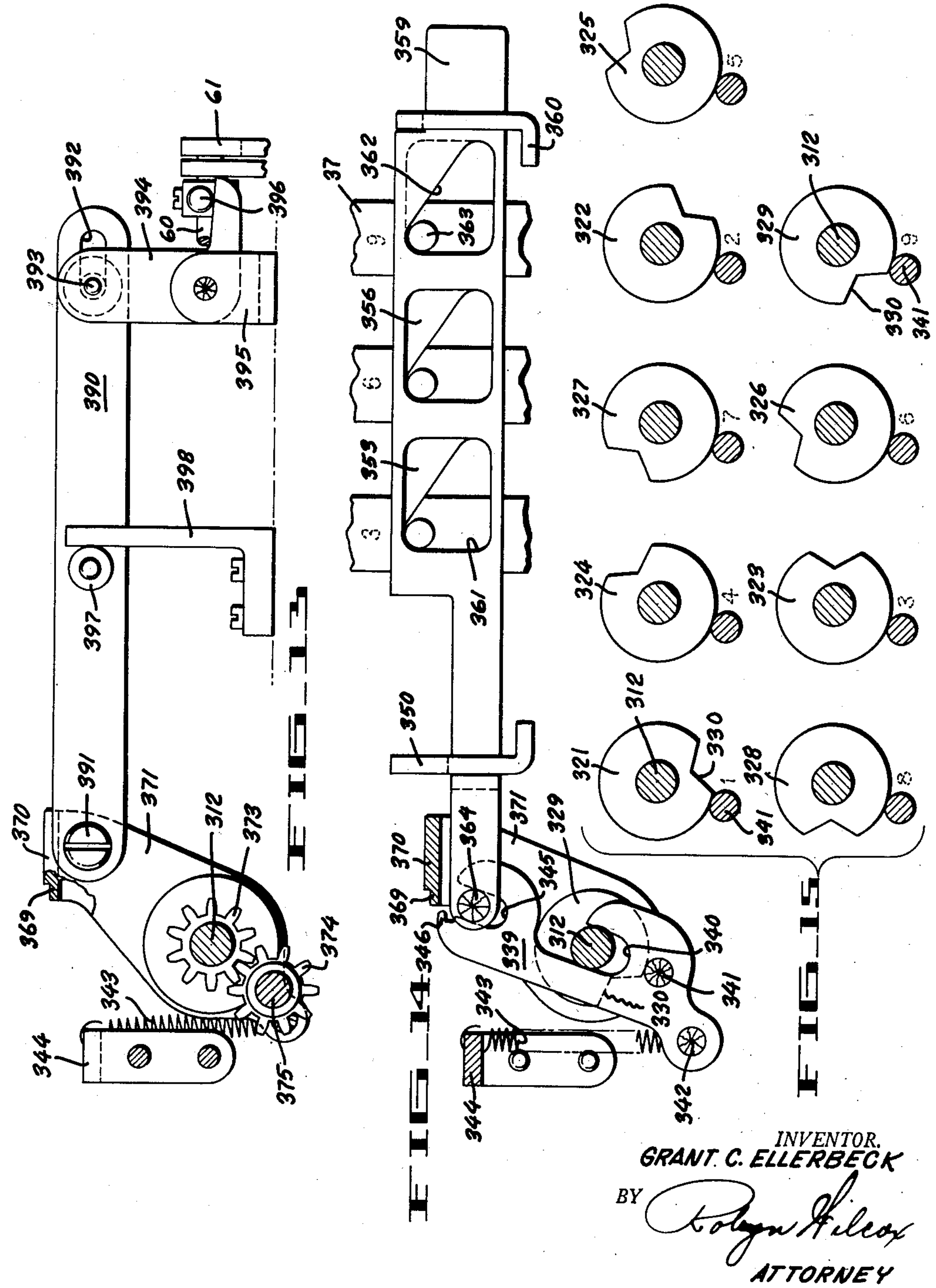
Fig. 13 is a right-side view of the mechanism of the multiplier unit taken along the longitudinal vertical plane indicated by the lines 13—13 of Figs. 1 and 12, with certain parts removed which are unnecessary to an understanding of this invention.
Fig. 14 is a right-side sectional view of the multiplier value entering means taken on a plane to the left of that of Fig. 13, as along the plane indicated by the lines 14—14 of Figs. 1 and 12.
Fig. 15 shows the arrangement of the cams, mounted on a common shaft, which controls the entry of values into the multiplier unit, reading from left to right.

The shaft 312, to which the ratchet wheel 313 is secured, extends across the front of the machine, being journalled in the auxiliary bracket 24 and right frame plate 22 on its right end (Figs. 9 and 10), and the auxiliary control plate 26 on the left-hand side of the machine, as shown in Fig. 12. In front of the multiplier unit, that is in front of the multiplier keps 35, the shaft 312 is provided with nine cam disks 321 to 329, inclusive, which are rigidly secured to the shaft. These cams are arranged, reading from left to right, in the order shown in Fig. 15. The cams are identical in shape and each is provided with a notch 330, the cam plates being so mounted on the shaft 312 that their respective notches are located as shown in Fig. 15.

Associated with the cams 321 to 329, inclusive, are nine identical links 331 to 339, inclusive, arranged as shown in Fig. 12 (the link 331 being associated with the cam 321, link 332 with cam 322, etc.). Each of the links 331 to 339, inclusive, is provided with a slot 340 which embraces the shaft 312, as shown in Fig. 14. Each of the links 331 to 339, inclusive, also carries a stud 341 engaging the periphery of its associated cam 321 to 329, inclusive. Each of the links 331 to 339 also carries a spring stud 342 at the lower end thereof, upon which is seated a spring 343 tensioned between the stud and a bracket 344, thereby lifting the link and tending to rock it clockwise about the shaft 312. Normally the cams 321 to 329, inclusive, engage the respective studs 341 as shown in Fig. 15, forcing the links 331 to 339 downwardly against the tension of their respective springs 343. However, when the counter, or transfer control, shaft 312 is given a single increment of motion (clockwise in these figures) the depression 330 on cam 321 rotates so that the stud 341 on the respective link 331 lies in the depression 330, whereupon the spring 343 lifts the link 331 as far as the depth of the depression 330 will permit. Of course, each of the other cams 322 to 329, inclusive, have been rotated a single increment at the same time, but in so doing their respective depressions 330 do not engage the studs 341 on the respective links. On the second increment of motion, the further rotation of shaft 312 further rotates the cam 321 thereby disengaging the stud 341 of link 331 from the depression 330 and permitting the stud 341 of link 332 to enter the depression 330 on cam 322. In this way values from "1" to "9" set in the counter control shaft 312 by the mechanism previously described, are represented by the angular position of the cams 321 to 329, inclusive, and the raised position of one of the links 331 to 339, inclusive. Whenever a cam assumes an angular position such that its depression 330 lies opposite the stud 341 on the respective link 331 to 339, inclusive, that particular link is permitted to rise while all of the others are held depressed.

There are nine camming slides 351 to 359, inclusive, respectively associated with the links 331 to 339, inclusive, and the respective value keys 35 of the multiplier mechanism. These slides are slidably mounted in brackets 350 and 360, the slides extending from front to rear of the machine as shown in Fig. 12. Preferably the respective slides are formed as shown in Fig. 12 so as to lie immediately adjacent one another in groups of three. The slides are each provided with two rectangular apertures 361, as shown in Fig. 14, and one triangular camming aperture 362. Each of the key stems 37 of the multiplier keys is provided with a long pin 363 extending through the aligned apertures in the associated slides. The slide 359, as shown in Fig. 14, has the two square apertures in the two forward positions and the triangular aperture at the rear; while slide 356 has the square apertures at each end with the triangular aperture in the middle; and the slide 353 has the triangular aperture at the front with the square apertures in the two rearward positions. Thus, the forward translation of any slide is operative, through the cam edge of the triangular aperture 362, to cam the associated pin 363 downwardly, thereby depressing the related multiplier value key. The rectangular apertures in the other two key stem positions have no effect upon the pins of those keys. The forward end of each of the slides 351 to 359 is provided with a suitable stud 364 which is embraced within a slot 345 in the upper end of the respective links 331 to 339, inclusive.

It will be obvious from what has been said before that the operation of the counting arm 170 is effective to rotate the shaft 312 to an angular position corresponding to the number of true subtractive operations in each order of the divisional operation. The angular position of the shaft 312 is reflected in the angular position of the nine cams 321 to 329, inclusive. If no value has been entered in that order the cams will be arranged as shown in Fig. 15—all of the cam depressions will fail to register with the associated stud 341 on the associated link, and all of the links will be held depressed. However, if a value has been placed in the shaft 312 then one, and one only, of the cams wiill have its depression 330 registering with the respective stud 341 thereby permitting the associated link to rise. At the end of the ordinal operation a bail, or gate, 370 is operated, as will next be described, rocking forwardly (counter-clockwise in Figs. 13 and 14) to rock the single elevated link counter-clockwise about the shaft 312. Such rocking of a link pulls the associated slide, 351 to 359, inclusive, forwardly, thereby depressing the associated key stem 37.

An operating bail 370, associated with the links 331 to 339, inclusive, is mounted on suitable supporting arms 371. The arms 371 are rotatably mounted on the shaft 312 previously mentioned. The forward edge of the bail 370 is provided with a narrow nose 369 adapted to engage under the nose 346 on the upper edge of the links 331 to 339, inclusive. Thus, the nose 369 will lock under the nose 346 of an elevated link, thereby preventing disengagement of the link from the operating bail during the rocking of the bail. The bail is operated by means of a sleeve 372 integral with the right-hand supporting arm 371 (see Fig. 12). Integral with the sleeve 372 is a gear 373. The bail is operated by means of rotation of a shaft 375 upon which is rigidly secured a gear 374 meshing with the gear 373 (see Fig. 13). The operation of the shaft 375 occurs in the first cycle after termination of the count, i. e., in the additive corrective cycle of the division operation.

The means for operating the shaft is shown particularly in Figs. 10 and 7. The shaft 375, as shown, extends transversely across the front of the machine and through the right-hand auxiliary bracket 24. An arm 376 is rigidly secured to the right-hand end of the shaft. This arm is connected by means of a link 377 to a bellcrank 378 located at the rear of the machine adjacent the pin wheel 213. The arm 376 is pivotally secured to the link 377 by any suitable means, such as screw 381, and the link in turn is secured to the bellcrank by a suitable means such as stud 382. The link 377 can well be a single piece but preferably will be formed of two sections resiliently urged together by a suitable spring 383, the two sections being connected by a pin and slot connection 384.

The bellcrank 378 is pivotally mounted on the right auxiliary control plate 23 by any suitable means, such as screw 379. The bellcrank 378 has a rearwardly extending arm provided with a nose 380 which lies in the path of travel of the pins 217. It will be recalled that when the mechanism of my invention is in its operating condition, the bellcrank 230 is rocked clockwise from the position shown in Fig. 8, whereby its camming nose 233 lies outside of the path of travel of these pins. Therefore, the bellcrank 230 is not operative to restore a projected pin at the start of the cycle. In this condition, which occurs upon the happening of the overdraft and the operation of the bellcrank 245 to project the pin then in the full-cycle position, the projected pin first engages the nose 380 of the bellcrank 378, rocking the bellcrank clockwise in Fig. 7, pulling the link 377 rearwardly and rocking the arm 376 and shaft 375 clockwise in Fig. 10. The rocking of the shaft 375 through the gearing 374, 373, rotates the bail 370 sharply forward (counterclockwise in Fig. 13) to pull the proper slide 351 to 359, inclusive, forwardly to depress the proper value key 35 and thereby set a value in the multiplier mechanism.

The operation of the bail 370 is also operative to operate the escapement mechanisms 60, 61 of the multiplier carriage, thereby stepping the multiplier pin carriage, not shown herein, one order to the left. The mechanism for this is shown particularly in Figs. 12 and 13, and comprises a link 390, its forward end pivotally secured to the bail 370 by any suitable means such as screw 391. The rear end of the link 390 is provided with a slot 392 which embraces a pin 393 in a bellcrank 394. The bellcrank is pivotally mounted on a suitable bracket 395. The rear arm of the bellcrank underlies a stud 396 rigidly secured to shaft 60. Thus, the rocking of the bail 370 pulls the link 390 forwardly, rocking bellcrank 394 (counterclockwise in Fig. 13) at the end of the forward stroke of the link 390. The rocking of the bellcrank 394 rocks the pin 396 and its shaft 60 to operate the escapement mechanism. By this means, a value of "0," or the operation of the shaft 375 before a value has been set in shaft 312, sets no value in the multiplier mechanism but is operative to set the mechanism one order to the left for operation in the next lower order.

Preferably the link 390 will be provided with a fibre stud 397 adapted to engage a bracket 398 in its rearward inoperative position, the fibre stud operating as a stop to prevent overthrow of the mechanism herein mentioned.

The projected pin 217 which has been operative to operate the transfer bail 370 as just described, is also operative, in the next cycle of machine operation, to clear the value from the transfer shaft 312. The mechanism for this clearing operation is shown particularly in Figs. 7 and 10. In the second cycle of operation after a pin is projected, if it is permitted to remain projected, the pin engages the forward edge of a clearing arm 410, which is pivotally mounted on the long stud or screw 263 upon which the rocking arm 261 is also mounted. A long link 411 extends forwardly from the arm 410, the two being pivotally interconnected by a suitable stud 412. Preferably the linkage is provided with a shock link, in the nature of a toggle, comprising two links 413 and 414. The link 413 is pivotally secured to the long link 411 by a suitable stud 415 and the other link 414 is pivotally mounted on the screw 263. The two toggle, or shock links 413 and 414 are pivotally secured together by a suitable stud 416 and are provided with a tension spring 417 tensioned around the stud 416 and seated on suitable studs on the links. This shock link arrangement prevents overthrow of the link 411 without the noise and shock which is incident to the normal stop pin abutting against a bracket. The link 411 is biased toward the front of the machine by a suitable tension spring 418 tensioned between a stud on the link and a stud on the frame plate, not shown.

The forward end of the link 411 (see Fig. 10) is mounted on the short depending arm of a bellcrank 425 by any suitable means, such as screw 427. The bellcrank 425 is mounted on the auxiliary bracket 24 by any suitable means, such as the screw 428. The forward arm of the bellcrank 425 carries an integral rack 426. The rack is adapted to engage a clearing gear 435 rigidly secured to the transfer control shaft 312. In the form shown the clearing gear is a ten-tooth gear with two teeth removed, so that the rack 426 can pass by the gear 435 without engaging it, if the shaft 312 is in the "0" position. However, if the transfer shaft 312 has been rotated from its "0" position, then the teeth of rack 426 will engage the teeth of gear 435 to rotate the gear and shaft to the "0" position, after which the rack is free to move through the space left by the omitted teeth. Associated with the clearing rack and gear just mentioned is an overthrow block, somewhat on the nature of a Geneva block, comprising a plate 429 rigidly secured to the bellcrank 425 by any suitable means, such as rivets 430. Integral with the clearing gear 435, and in the plane of the blocking plate 429, is a single tooth 436 (shown in Fig. 11) which engages the peripheral edge of plate 429 to block overthrow of the clearing gear 435 and transfer shaft 312.

It is thus obvious that in the second cycle after the pin 217 is projected (which is the shifting cycle in a division operation) the pin engages the arm 410 pulling the link 411 rearwardly, thereby rocking the clearing bellcrank 425 to clear the value previously set in the counter transfer shaft 312. The mechanism of my invention is then ready for a transfer of the subtractive cycles to the multiplier mechanism in the next order of machine operation. It can also be mentioned that the projected pin 217 is restored to its retracted position by the fixed cam 250 previously described (see Fig. 7).

Preferably the quotient transfer shaft 312 will be provided with a suitable detent such as the star wheel 437 shown in Fig. 12, associated with which is a spring-pressed ball, not shown. Such a detent is operative to hold the transfer shaft and its associated cams in the correct angular position to give accurate registration in the multiplication unit.

Preferably the mechanism of my invention will be provided with means to clear the quotient transfer shaft 312 in the first cycle of a division operation invariably and automatically. Such a mechanism is shown particularly in Figs. 2 and 5. In the preferred form, this automatic clearing mechanism comprises a slide 440 mounted adjacent the pin wheel 213. This slide is mounted for horizontal sliding movement by any suitable means such as slots 441 therein, embracing studs 442 mounted in the frame plate 23. The slide is urged to a forward position by a relatively strong spring 443. The forward end of the slide is provided with a latching shoulder 444 which normally engages an ear 445 on latching bellcrank 446. The bellcrank 446 is pivoted to the auxiliary control plate 23 by any suitable means, such as screw 447, and is urged into latching engagement with the slide (clockwise in Fig. 2) by a suitable spring 448 tensioned between the bellcrank and a stud on the auxiliary control plate. The latching bellcrank 446 is rocked to its disengaging position by the rocking of division trigger latch 71 by means of a link 449, the forward end of which is pivotally secured to the latch 71, as by pin 450, and the rearward end of which is provided with a slot 452 embracing a pin 451 on the bellcrank. Thus, the bellcrank is rocked to its releasing position upon the initiation of a division operation, whereby the cam slide 440 is released for forward movement under the force of spring 443.

The cam slide 440 is provided with an integral cam ear 454 which travels in a path to engage the lowermost pin 217 on the pin wheel 213. Thus, the initiation of division and the forward translation of slide 440 enables the cam 454 to project the lowermost pin 217 to its operative position. It will be noted, as by reference to Fig. 7, that the lowermost pin 217 lies behind the cam nose 233 of bellcrank 230, so that the pin is ineffective to rock the bellcrank and related mechanism, but is operative to engage the clearing arm 410 thereby clearing the transfer shaft 312 as above described.

It is preferred that the slide 440 be immediately restored to its inoperative position. A ready means for securing this relatching of the slide is shown in Fig. 7 and comprises an arm 461 pivotally mounted on a bracket 467 by any suitable means such as screw 466. The arm 461 is provided with a stud 460 which embraces a slot 453 in the rearward end of the camming slide 440. The arm 461 is also provided with a stud 465 which is embraced by a slot 464 in a forwardly extending link 462. The link 462 is pivotally secured to the clearing arm 410 by any suitable means such as stud 463. Therefore, the rocking of the clearing arm 410 is operative through link 462 and arm 461 to move the slide 440 to its rearward position, where it is again latched by the latch 446.

It will be understood that normally it will be preferable to have an interlock which will prevent the depression of the quotient transfer key 275 when the multiplier mechanism has a value registered therein. As the need for an interlock is obvious, and as they are deemed to be not inventive, one has not been shown herein. It will be understood that such an interlock is contemplated and in fact has been inserted on the model of the machine of this invention which I have heretofore made.

It is believed that the operation of the mechanism of my invention will be readily understood from the preceding description and it is therefore deemed unnecessary to repeat what has heretofore been said.

I claim:

1. In a cyclic calculating machine having a register in which a dividend is set; a selection mechanism in which a divisor is set; an automatic division programming mechanism; and a multiplier mechanism for storing a multiplier factor, a cyclically operated member, a differentially positionable member, connecting means for differentially positioning said positionable member by operation of said cyclically operated member, blocking means operative in predetermined cycles of a division operation to suppress operation of said connecting means, and means for setting a value in said multiplier mechanism in accordance with the position of said differentially positionable member.

2. In a cyclic calculating machine having a first factor receiving mechanism; a selection mechanism; an operation programming mechanism; and a second factor receiving mechanism, a cyclically operated member, a differentially positionable member, connecting means for differentially positioning said positionable member by operation of said cyclically operated member, blocking means operative in predetermined cycles of operation to suppress operation of said connecting means, and means for setting a value in said second factor receiving mechanism in accordance with the position of said differentially positionable member.

3. In a cyclic calculating machine having a register in which a dividend is set, a selection mechanism in which a divisor is set, an automatic division programming mechanism, and a multiplier mechanism for storing a multiplier factor, a cyclically operated member, mechanism under the control of said division programming mechanism for blocking operation of said member in all except the second and succeeding subtractive cycles in any order, a differentially positionable member operated by said cyclically operated member, entry means controlled by said differentially positionable member for entering a value into said multiplier mechanism, and means for operating said entry means after the last subtractive cycle in any order.

4. The apparatus of claim 3 wherein the differentially positionable member comprises a shaft and cam members attached thereto; the entry means comprises members positioned by said cams and interponents connecting a positioned member to said multiplier mechanism; and said means for operating said entry means comprises a bail effective to operate a positioned member and interponent, and means to operate said bail.

5. In a cyclic calculating machine having a register in which a dividend is set; a selection mechanism in which a divisor is set; an automatic division programming mechanism including means for continuously subtracting the divisor from the dividend to an overdraft, then initiating an additive corrective cycle in which the divisor is restored to the dvidend, and then a shift cycle in which the relative ordinal position of the register and selection mechanism is shifted; a multiplier mechanism including multiplier value keys for storing a multiplier factor, a cyclic counting means, mechanism for blocking operation of said cyclic counting means in a division operation during the additive corrective and shift cycles and the first subtractive cycle in any order, a differentially positionable member operated by said counting means, means controlled by said differentially positionable member for selecting a multiplier key to be operated, and means for operating said multiplier key.

6. In a cyclic calculating machine having a register in which a dividend is set; a selection mechanism in which a divisor is set; an automatic division programming mechanism including means for continuously subtracting the divisor from the dividend to an overdraft, then initiating an additive corrective cycle in which the divisor is restored to the dividend, and then a shift cycle in which the relative ordinal position of the register and selection mechanism is shifted; and a multiplier mechanism for controlling a multiplication operation, the combination which comprises a cyclically operated actuating means, mechanism under the control of the division programming mechanism for blocking operation of said actuating means in a division operation during the additive corrective and shift cycles and the first subtractive cycle in any order, a differentially positionable member operated by said actuating means, entry means controlled by said differentially positionable member for entering a value into said multiplier mechanism, and means for operating said entry means during the additive corrective cycle in each order.

7. The mechanism of claim 6 comprising also means for returning the differentially positionable member to its original position during each shifting cycle.

8. In a calculating machine having an accumulator in which a dividend is registered; a selection mechanism in which a divisor is entered; an automatic division mechanism for controlling the cyclic subtraction of the divisor from the dividend, including program means operative to terminate operation in one relative ordinal position of said accumulator and the selection mechanism, to shift the relative ordinal position of such accumulator and selection mechanism, and then initiate another series of subtractions in the shifted relative ordinal position of such accumulator and selection mechanism; and a multiplier mechanism including multiplier value setting members for storing a multiplier factor, the combination comprising a drive member adapted to be operated with each cycle of machine operation, a differentially positionable transfer member, a blocking means operative to prevent operation of said drive member in all but the second and succeeding subtract cycles in each order in a division operation, interponent members between the transfer member and the multiplier value setting members and operative to set the value determined by the differential position of the transfer member into the said value setting members, means operated by the program means to operate said interponent members, and means for thereafter returning the transfer member to its original position.

9. In a calculating machine having an accumulator in which a dividend is registered, a selection mechanism in which a divisor is entered, an automatic division mechanism for controlling the cyclic subtraction of the divisor from the dividend, including program means operative to terminate operation in one relative ordinal position of said accumulator and the selection mechanism, to shift the relative ordinal position of such accumulator and selection mechanism, and then initiate another series of subtractions in the shifted relative ordinal position of such accumulator and selection mechanism; and a multiplier mechanism including multiplier value setting members for storing a multiplier factor, the combination comprising a drive member adapted to be operated with each cycle of machine operation, a differentially positionable transfer member, a blocking means under the control of said program means and operative to prevent operation of said drive member in predetermined cycles of a division operation, interponent members between the transfer member and the multiplier value setting members and operative to set the value determined by the differential position of the transfer member into the said value setting members, and means operated by the program means to operate said interponent members.

10. In a calculating machine having an accumulator in which a dividend is registered, a selection mechanism in which a divisor is entered, an automatic division mechanism for controlling the cyclic subtraction of the divisor from the dividend, means responsive to an overdraft in said accumulator for controlling operation of said division mechanism, and a multiplier mechanism including multiplier value entry keys for storing a multiplier factor, the combination comprising an actuating member operated with each cycle of machine operation, a transfer member differentially positionable to represent a value, an interponent member positionable to connect said actuating member to said transfer member, a blocking means operative to maintain said interponent member in an inoperative position in all but the subtract cycles in a division operation and for blocking return to its connective position until after the first cycle of subtractive operation in any order has been initiated, interponent members between the transfer member and the keys of the multiplier mechanism and operative to operate the multiplier keys, means for selecting for operation the one of said interponents corresponding to the differential position of the transfer member, means operated by the overdraft responsive means to disable said first-mentioned interponent and to operate the selected one of said second-mentioned interponents, and means for thereafter returning the transfer member to its original position.

11. In a calculating machine having an accumulator in which a dividend is registered, a selection mechanism in which a divisor is entered, an automatic division mechanism for controlling the cyclic subtraction of the divisor from the dividend, means responsive to an overdraft in said accumulator for controlling operation of said division mechanism, and a multiplier mechanism including multiplier value entry keys for storing a multiplier factor, the combination comprising an actuating member operated with each cycle of machine operation, a transfer shaft differentially positionable to represent a value, an interponent member positionable to connect said actuating member to said transfer shaft, a blocking means operative to maintain said interponent member in an inoperative position in all but the subtract cycles in a division operation and for blocking return to its connective position until after the first cycle of subtractive operation in any order has been initiated, value indicating cams on said shaft, interponent members between the cams and the keys of the multiplier mechanism and operative to operate the multiplier key corresponding to the differential position of the transfer shaft, means operated by the overdraft responsive means to disable said first-mentioned interponent and to operate the one of said second-mentioned interponents corresponding to the differential position of said transfer shaft, and means for thereafter returning the transfer shaft to its original position.

12. In a cyclic calculating machine having a register in which a dividend is set; a selection mechanism in which a divisor is set; an automatic division programming mechanism including means for continuously subtracting the divisor from the dividend to an overdraft, then initiating an additive corrective cycle in which the divisor is restored to the dividend, and then shifting the relative ordinal position of the register and selection mechanism; and a multiplier mechanism in which a multiplier may be registered including keys operative to insert values thereinto order by order, the combination which comprises an actuator member operated in each cycle of machine operation, a transfer member differentially positionable to represent a value, an interponent means for operatively connecting said actuating member to said transfer member to progressively position said transfer member from the cyclic operation of the actuating member, means operative to maintain said interponent member in disconnecting position during the first subtractive cycle in any order of division operation and during the additive corrective and shift cycles following an overdraft, connecting members for operating the keys of said multiplier mechanism, operating means positioned by the differential movement of said transfer member to select one of said connecting members for operation, and means operated by said division programming mechanism to operate the selected connecting member during the additive corrective cycle of division operation and to return the transfer member to its original position during the shift cycle of a division operation.

13. In a cyclic calculating machine having a register in which a dividend is set, a selection mechanism in which a divisor is set, an automatic division programming mechanism, and a multiplier mechanism for storing a multiplier factor, the combination which comprises a cyclically operated member, mechanism under the control of said division programming mechanism for blocking operation of said member in all except the second and succeeding subtractive cycles in any order, a shaft operated by said cyclically operated member, cam members attached to said shaft, members positioned by said cams, interponents connecting a positioned member to said multiplier mechanism, a bail effective to operate a positioned member and interponent, and means to operate said bail.

14. In a cyclic calculating machine having a first factor receiving mechanism; a selection mechanism; a division programming mechanism operative to divide a dividend in said first factor receiving means by a divisor in said selection mechanism; and a second factor receiving mechanism including a ten-key keyboard, the combination which comprises a cyclically operated member, a shaft, connecting means for rotating said shaft differential amounts by operation of said cyclically operated member, blocking means operative in predetermined cycles of operation of said division programming mechanism to suppress operation of said connecting means, value selecting elements mounted on said shaft, operating members for the keys of said keyboard, means controlled by said value selecting elements for selecting the operating member to be operated, means for operating the selected operating member, and means for restoring said shaft to its original angular position.

15. In a cyclic calculating machine having a register in which a dividend is set; a selection mechanism in which a divisor is set; an automatic division programming mechanism; and a multiplier mechanism including a ten-key keyboard for storing a multiplier factor, the combination which comprises a cyclically operated member, a differentially rotatable shaft, connecting means for differentially rotating said rotatable shaft by operation of said cyclically operated member, blocking means operative in predetermined cycles of a division operation to suppress operation of said connecting means, ten value cams on said shaft so mounted that the cam representative of the value corresponding to the angular position of the shaft lies in a predetermined angular position, an interponent positioned by each cam, means connecting each interponent to its respective key, and means for operating the interponent of the cam which lies in the predetermined angular position.

16. In a cyclically operable calculating machine having a register in which a dividend is set; a selection mechanism in which a divisor is set; an automatic division programmng mechanism; a multiplier mechanism for storing a multiplier factor and a ten-key keyboard for inserting values into said multiplier mechanism, means for inserting values in said keyboard comprising a shaft, a cyclically operated member, a connecting means for differentially rotating said shaft by operation of said cyclically operated member, blocking means operative in predetermined cycles of a division operation to suppress operation of said connecting means, value cams mounted on said shaft, operating members for the keys of said keyboard, means controlled by said cams for selecting the operating member to be operated, and means for operating the selected operating member.

17. In a cyclically operable calculating machine having a dividend factor receiving mechanism; a selection mechanism; a division programming mechanism; and a second factor receiving mechanism having a selection mechanism including ten digital value members, an improved means for inserting values into said digital value members comprising a cylically operated member, a differentially positionable member, connecting means for differentially positioning said positionable member by operation of said cyclically operated member, blocking means operative in predetermined cycles of operation of said division programming mechanism to suppress operation of said connecting means, value selecting elements positioned by said differentially positionable member, operating members for the digital value members, means controlled by said elements for selecting the operating member to be operated, and means for operating the selected operating member.

(References on following page)

References Cited in the file of this patent

UNITED STATES PATENTS

| | | |
|---|---|---|
| 1,900,042 | Brown | Mar. 7, 1933 |
| 1,916,611 | Friden | July 4, 1933 |
| 1,964,211 | Overbury | June 26, 1934 |
| 1,969,262 | Friden | Aug. 7, 1934 |
| 2,136,694 | Laiho | Nov. 15, 1938 |
| 2,325,388 | Friden | July 27, 1943 |
| 2,399,917 | Friden et al. | May 7, 1946 |
| 2,403,273 | Friden et al. | July 2, 1946 |
| 2,531,208 | Gang | Nov. 21, 1950 |
| 2,687,254 | Hopkins | Aug. 24, 1954 |